United States Patent [19]

Brinkman et al.

[11] 4,044,745
[45] Aug. 30, 1977

[54] INJECTOR PUMP

[75] Inventors: Willem Brinkman, Velp; Bernard Breunkink, Enschede, both of Netherlands

[73] Assignee: Holec, N.V., Hengelo, Netherlands

[21] Appl. No.: 665,113

[22] Filed: Mar. 8, 1976

Related U.S. Application Data

[63] Continuation of Ser. No. 416,852, Nov. 19, 1973, abandoned.

[30] Foreign Application Priority Data

Mar. 14, 1973 Netherlands .................. 7303579

[51] Int. Cl.² .................................. F02M 32/00
[52] U.S. Cl. .................... 123/139 E; 417/415; 417/460
[58] Field of Search ............. 123/32 EA, 139 E, 410; 417/415, 460, 469

[56] References Cited

U.S. PATENT DOCUMENTS

| 1,534,829 | 4/1925 | Behnke | 123/32 EA |
|---|---|---|---|
| 1,925,934 | 9/1933 | Rimstad et al. | 417/460 |
| 2,077,259 | 4/1937 | Planiol | 123/139 E |
| 2,852,308 | 9/1958 | Whitson | 123/32 EA |
| 2,885,860 | 5/1959 | Roy | 417/415 |
| 2,950,706 | 8/1960 | Sencker | 123/32 EA |
| 3,009,628 | 11/1961 | Kolfertz | 417/460 |
| 3,665,907 | 5/1972 | Laufer | 123/139 E |
| 3,685,526 | 8/1972 | Hobo et al. | 123/139 E |
| 3,713,755 | 1/1973 | Scheffer | 417/469 |
| 3,728,989 | 4/1973 | Monpetit et al. | 123/139 E |
| 3,784,334 | 1/1974 | Hilgert | 417/410 |

FOREIGN PATENT DOCUMENTS

| 568,216 | 3/1945 | United Kingdom | 123/139 E |
|---|---|---|---|
| 397,493 | 8/1933 | United Kingdom | 123/139 E |

Primary Examiner—Carroll B. Dority, Jr.
Assistant Examiner—Paul Devinsky
Attorney, Agent, or Firm—Snyder, Brown & Ramik

[57] ABSTRACT

In order to reduce the CO-content in exhaust gases of combustion engines, the atomization is improved by coupling the displacer body of a fuel pump with the armature of an electro-magnet, which armature is arranged so as to be movable between two electro-magnets and is adapted to move each time to one of the two electro-magnets at the alternating energization of the latter.

39 Claims, 4 Drawing Figures

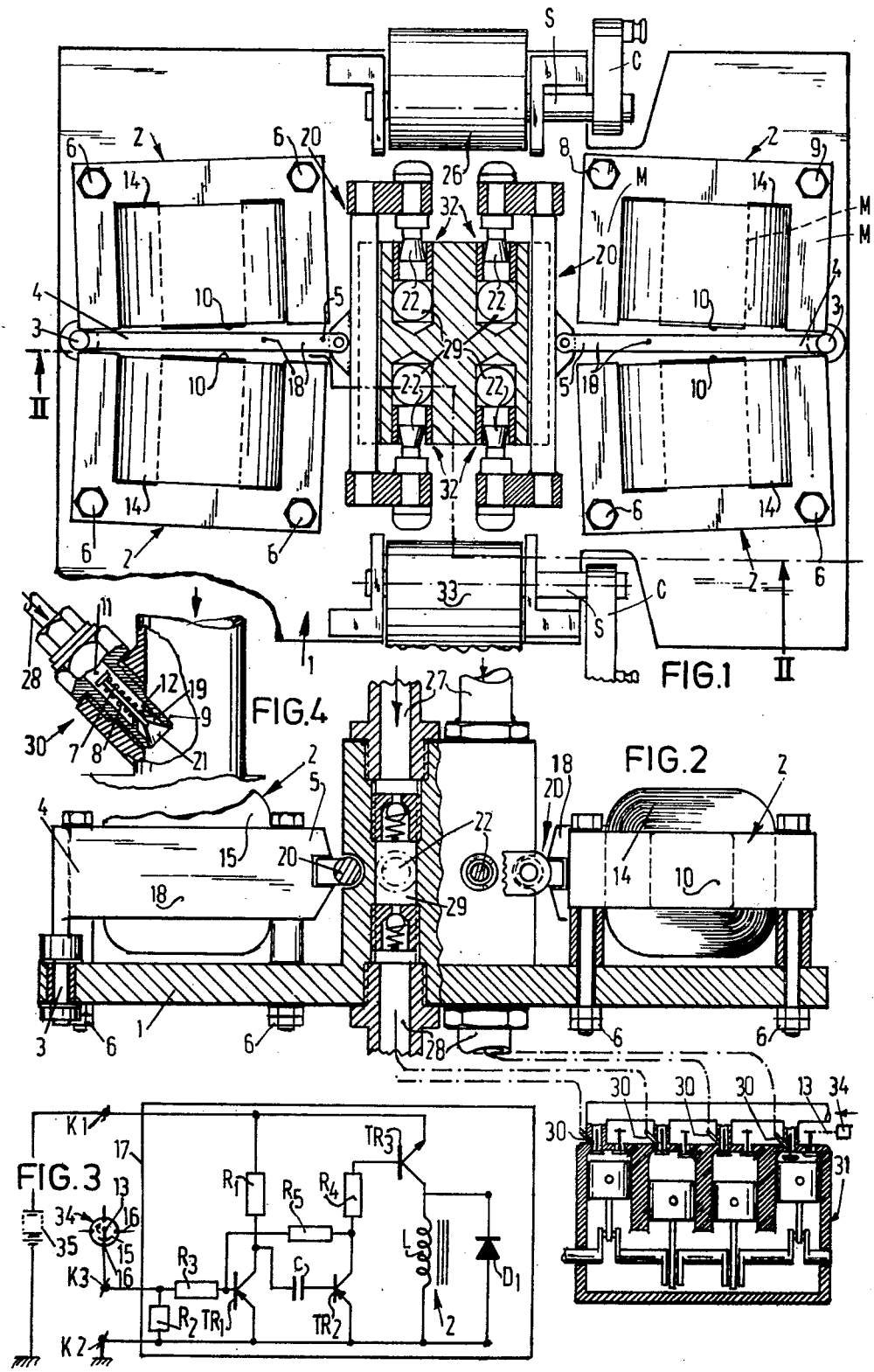

INJECTOR PUMP

This is a continuation of application Ser. No. 416,852 filed Nov. 19, 1973 now abandoned.

The invention relates to an injector for delivering fuel to at least one atomizer of a combustion engine, in which the displacer body of at least one fuel pump is driven by the armature of at least one electro-magnet, which pump communicates with the atomizer.

In the prior-art injector the armature is arranged in the coil of an electro-magnet and is adapted to reciprocate axially in the coil.

The invention has for its object to reduce the content of environmentally contaminating constituents such as CH-compounds and/or CO in the exhaust gases of a combustion engine and to prevent spilling of fuel. According to the invention this is achieved by improving the atomization of the fuel by causing the armature to move towards an energized electro-magnet during each pump stroke. The armature is moving under the action of a magnetic force which increases drastically as the armature approaches the magnet so that rate of movement of the armature and the displacer body coupled therewith increases strongly. As a result the atomizing pressure is still high at the end of the pump stroke of the displacer body, when the atomizer has been open for some time and liquid has been atomized by the atomizer.

A high speed of the displacer body is advantageous to maintaining a high pressure of the fuel supplied to the atomizer.

A further object of the invention is to avoid counter-forces exerted on the displacer body or on the armature, for example, reset spring forces, during the pump stroke. For this purpose the invention provides an injector for delivering fuel to at least one atomizer of a combustion engine, in which the displacer body of at least one fuel pump is driven by the armature of at least one electro-magnet, which pump communicates with the atomizer, which is improved in this respect because under the action of two alternately energized electro-magnets the armature is capable of moving in opposite senses.

The mass of the armature is thus minimized, which provides the additional advantage that the required number of windings of the magnet coil and hence the resultant self-inductance are small so that the building-up time of the magnetic field is short. Compact magnets permit of obtaining a high pump frequency.

If one end of the armature is adapted to pivot about a fulcrum, the path covered by the freely movable end portion of the armature exceeds the width of the gap of the electro-magnet, which may therefore be small.

In a four-cylinder engine the cylinders are operating pair-wise in counter-phase. Therefore, the associated fuel pumps are also driven in counter-phase. For this purpose the armature of the electro-magnet is connected in addition with a displacer body of a second pump operating in counter-phase. The control-circuit of each electro-magnet may be formed by a monostable multivibrator, one output of which is connected through an amplifying circuit to the coil of the electro-magnet. The monostable multivibrator is triggered by a pulse derived from the ignition mechanism of the combustion engine. In order to permit variation of the pump volume, the stroke of each displacer body can be regulated by adjustable stop means for the armature. Preferably immediately after the end of a stroke of the displacer body the current passing through the electro-magnet is interrupted, which is enabled by appropriate choice of the time constant of the monostable multivibrator.

The invention provides furthermore a combustion engine comprising an injector embodying the invention.

The invention will be described more fully with reference to the accompanying drawings.

FIG. 1 is a schematic plan view of an arrangement of four fuel pumps of an injector combined to form a single unit, and driven by electro-magnetic agency in accordance with the invention.

FIG. 2 is a sectional view taken on the line II—II in FIG. 1.

FIG. 3 shows the circuit-diagram of an electronic control and

FIG. 4 shows an atomizer on an enlarged scale.

To the base plate 1 are secured two pairs of electro-magnets 2 by means of bolt-and-nut connections 6. Each of the electro-magnets 2 comprises a core 10 and an energizing coil 14 surrounding the core 10. Between each pair of magnets 2 an armature 18 is adapted to swing. Each armature 18 swings by one end 4 about a pivot 3. At the free end 5 each armature 18 holds a yoke-shaped coupling member 20, with which are connected two displacer bodies 22 of two pumps 32. The stroke of the displacer bodies 22 is determined by adjustable stop means 26 and 33 for the coupling members 20 on either side of the pumps 32. As noted above, preferably immediately after the end of a stroke of the displacer body the current passing through the electro-magnet is interrupted, which is enabled by appropriate choice of the time constant of the monostable multivibrator. Thus, each monostable establishes a time duration during which electromagnetic motivating force acts upon an armature to move it and pump fuel, and during each such time duration a stop 26 or 33 arrests the motion of the armature whereby to control the volume of fuel so pumped.

As shown in FIG. 1, each stop 26, 33 is in the form of a cylinder rotatable about an eccentric axis and shafts S,S fixed to these cylinders are provided with crank levers C,C by means of which the cylinders individually may be rotated so as to vary the stroke of the displacer bodies. Thus, the timing of each motion arresting of an armature during the aforesaid time duration will alter the extent of movement of the displacing member in at least one direction of its movement (either from the stop 26 to the stop 33, or vice versa) thereby controlling the volume of fuel pumped per stroke.

As also noted above, improved atomization is achieved by causing the armature to move towards an energized electro-magnet during each pump stroke; the armature moving under the action of a magnetic force which increases drastically as the armature approaches the magnet so that rate of movement of the armature and the displacer body coupled therewith increases strongly; and that as a result the atomizing pressure is still high at the end of the pump stroke of the displacer body, when the atomizer has been open for some time and liquid has been atomized by the atomizer.

This increasing magnetic force is achieved by virtue of the fact that the armature is moving increasingly closer to the free ends of the legs M of the associated electromagnet 2. As is evident from FIGS. 1 and 2, each core or frame 10 is of E-frame configuration and the winding is around the central leg M. This will establish a flux field through the E-frame which is completed through air and through the armature between the end faces of the outside legs M and the end face of the central leg M. Thus, as the armature moves, it moves progressively closer to the end faces of the three legs of the energized electro-magnet. This effects the increasing force acting on the armature.

As is further noted above, in a four-cylinder engine the cylinders are operating pair-wise in counter-phase; and the associated fuel pumps are also driven in counter-phase. That is, referring to FIG. 2 and numbering the cylinders 1,2,3 and 4 from right-to-left as would be conventional, the pistons numbers 1 and 4 operate in counter-phase (i.e. their power strokes are 180° out of phase or, stated otherwise, separated by 360° of crankshaft rotation) whereas the pistons numbers 2 and 3 likewise operate 180° out of phase, all as is conventional for a four stroke cycle engine. Thus, in the conventional firing order for such an engine (i.e. 1-3-4-2), the energization of the four electromagnets will be in the same order, one pair of electro-magnets operating on one armature to provide injections for cylinders numbers 1 and 4 and the other pair of electromagnets operating on the other armature to provide injections for cylinders 2 and 3. Each pump 32 comprises a pump chamber 29, having a fuel inlet 27 and a fuel outlet duct 28, each of them leading to an atomizer 30 of a combustion engine 31. Each atomizer 30 comprises a needle 7, a conical end 21 of which is hermetically drawn by a strong s ring 8 to the seat 9. This end 21 is urged away from the seat against the action of the spring 8 at a high fuel pressure in a chamber connected with the fuel duct 28 and a chamber 19 communicating with the former through a perforated collar 12.

Each electro-magnet 2 is controlled by a circuit 17 shown schematically in FIG. 3. The transistors $TR_1$ and $TR_2$, together with the associated resistors $R_1$, $R_2$, $R_3$, $R_4$ and $R_5$ and the capacitor C, constitute a monostable multivibrator. The resistor $R_1$ and the capacitor C determine the time constant. The collector output of the transistor $TR_2$ constitutes via the resistor $R_4$ the input of transistor $TR_3$, which operates as an amplifier for the current to be passed through the coil $L_1$ of the electro-magnet. 2. Across the coil $L_1$ is connected a quenching diode $D_1$. To the input terminals $K_1$ and $K_2$ is connected a supply source 35, whilst the input $K_3$ serves to supply a control-pulse which may be derived from a pulse producer 34, which is coupled with the engine 31. The pulse producer 34 may be coupled with the cam shaft 13 of the combustion engine 31 and is provided with a rotating contact 15, which comes into contact in turn with one of the four contacts 16, each of which is connected to an input terminal $K_3$ of a circuit 17. In this way an atomizer 30 injects the fuel required for each combustion cylinder during each cycle of the combustion engine 31 at the required instant.

What is claimed is:
1. The method of forming a combustible fuel/air mixture for an internal combustion engine, which comprises the steps of:
    a. providing an armature which is pivoted at one end so as to present a free end which may swing freely back and forth and which free end has at least one fuel displacing member connected thereto;
    b. intermittently pumping fuel into admixture with air to form fuel/air mixture by swinging said free end of the armature back and forth in response only to electro-magnet motivating forces;
    c. effecting said motivating forces for intermittent time durations to act alternately in opposite directions by subjecting a region of said armature lying between its ends to electro-magnetic attraction first on one side of the armature and then on the other side of the armature and so on so that fuel is discharged at a rate which increases strongly during each discharge period;
    d. intercepting the motion of said armature and the fuel-displacing member connected to it during each of said time durations positively to terminate motion of said member substantially at the instant of each interception whereby to control the volume of fuel pumped during each intermittent fuel discharge period;
    e. controlling the frequency of occurrence of said motivating forces according to engine speed; and
    f. controlling the volume of fuel pumped per intermittent discharge period by changing the timing of motion termination whereby to alter the extent of movement of said displacing member in a direction of movement of said displacing member.

2. In a system for providing combustible fuel/air mixture to an internal combustion engine, in combination:
    discharge means for discharging liquid fuel;
    pump means connected with said discharge means for delivering liquid fuel to said discharge means;
    drive means connected to said pump means for causing said pump means intermittently to deliver liquid fuel, said drive means comprising an actuator connected to said pump means, a pair of mutually opposed electro-magnets spaced on opposite sides of said actuator, and means for sequentially energizing said electro-magnets to shuttle said actuator back and forth within the region between said electro-magnets; and
    control means for adjustably delineating the stroke of the shuttling movement of said actuator within the region between said electro-magnets whereby to control the quantity of liquid fuel intermittently delivered by said pump means, said actuator being pivoted at one end and connected to said pump means at its opposite end, said electro-magnets operating on said actuator between the opposite ends thereof.

3. In a fuel injection system as defined in claim 2 wherein said actuator is an armature of plate-like configuration having opposite side faces and is adapted to swing back and forth in directions perpendicular to said side faces, each electro-magnet comprising a frame presenting legs and a winding on said frame and said electro-magnets having the free ends of their legs disposed closely adjacent the respective side faces of said plate-like armature and between the opposite ends thereof, whereby as each electro-magnet is energized the armature swings progressively to a position closer to such electro-magnet.

4. In a fuel injection system as defined in claim 2 wherein said actuator is an armature of plate-like configuration having opposite side faces and is adapted to swing back and forth in directions perpendicular to said side faces, each electro-magnet comprising an E-frame presenting three legs and a winding on the central leg and said electro-magnets having the free ends of their legs disposed closely adjacent the respective side faces of said plate-like armature and between the opposite ends thereof, whereby as each electro-magnet is energized the armature swings progressively to a position closer to such electro-magnet.

5. In a system for providing combustible fuel/air mixture to an internal combustion engine, in combination:
discharge means for discharging liquid fuel;
pump means connected with said discharge means for delivering liquid fuel to said discharge means;
drive means connected to said pump means for causing said pump means intermittently to deliver liquid fuel, said drive means comprising an actuator connected to said pump means, a pair of mutually opposed electro-magnets spaced on opposite sides of said actuator, and means for sequentially energizing said electro-magnets to shuttle said actuator back and forth within the region between said electro-magnets; and
control means for adjustably delineating the stroke of the shuttling movement of said actuator within the region between said electro-magnets whereby to control the quantity of liquid fuel intermittently delivered by said pump means,
said pump means including a cylinder block assembly having a pair of pump chambers therein and a movable member associated with each chamber, said actuator being connected to both movable members to actuate them in unison, said movable members being disposed on opposite sides of said actuator whereby one pump chamber is subjected to increasing volume while the other is subjected to decreasing volume and vice versa.

6. In a fuel injection system as defined in claim 2 wherein said pump means includes a cylinder block assembly having a pair of pump chambers therein and a movable member associated with each chamber, said actuator being connected to both movable members to actuate them in unison, said movable members being disposed on opposite sides of said actuator whereby one pump chamber is subjected to increasing volume while the other is subjected to decreasing volume and vice versa.

7. In a fuel injection system as defined in claim 5 wherein said movable member is in the form of a piston.

8. In a fuel injection system as defined in claim 2 wherein said pump means includes a cylinder block assembly having a pair of pump chambers therein and a movable member associated with each chamber, said actuator being connected to both movable members to actuate them in unison, said movable members being disposed on opposite sides of said actuator whereby one pump chamber is subjected to increasing volume while the other is subjected to decreasing volume and vice versa.

9. In a fuel injection system as defined in claim 3 wherein said pump means includes a cylinder block assembly having a pair of pump chambers therein and a movable member associated with each chamber, said actuator being connected to both movable members to actuate them in unison, said movable members being disposed on opposite sides of said actuator whereby one pump chamber is subjected to increasing volume while the other is subjected to decreasing volume and vice versa.

10. In a fuel injection system as defined in claim 8 wherein each movable member is in the form of a piston.

11. In a fuel injection system as defined in clam 3 wherein said movable member is in the form of a piston.

12. In a fuel injection system as defined in claim 2 wherein said movable member is in the form of a piston.

13. In a fuel injection system as defined in claim 2 wherein said control means is in the form of a pair of stops spaced on opposite sides of said actuator, at least one of said stops being movable to control said stroke.

14. In a fuel injection system as defined in claim 3 wherein said control means is in the form of a pair of stops spaced on opposite sides of said actuator, at least one of said stops being movable to vary the spacing between the stops.

15. In a fuel injection system as defined in claim 5 wherein said control means is in the form of a pair of stops spaced on opposite sides of said actuator, at least one of said stops being movable to vary the spacing between the stops.

16. In a fuel injection system as defined in claim 7 wherein said control means is in the form of a pair of stops spaced on opposite sides of said actuator, at least one of said stops being movable to vary the spacing between the stops.

17. In a fuel injection system as defined in claim 8 wherein said control means is in the form of a pair of stops spaced on opposite sides of said actuator, at least one of said stops being movable to vary the spacing between the stops.

18. In a fuel injection system as defined in claim 10 wherein said control means is in the form of a pair of stops spaced on opposite sides of said actuator, at least one of said stops being movable to vary the spacing between the stops.

19. A fuel injection system comprising, in combination:
at least two fuel injection nozzles;
a fuel pump assembly comprising at least two fuel chambers disposed with their axes in a common plane, means for supplying fuel under low pressure to each chamber and including a check valve associated with each chamber to prevent back flow of fuel, a first fuel outlet conduit connecting one of said nozzles to one of said chambers and a second fuel outlet conduit connecting the other of said nozzles to the other of said chambers and each conduit including a check valve responsive to pressure greater than said low pressure for passing fuel to the associated nozzle, a piston reciprocable in each fuel chamber, and drive means for urging said pistons periodically first in one direction and then in the opposite direction sequentially to receive low pressure fuel and to discharge fuel under high pressure to a respective nozzle; and
first stop means for positively limiting the movements of said pistons in one direction and second stop means for positively limiting the movements of said piston in the other direction, first control means connected with said first stop means for moving said first stop means adjustably to increase and decrease the strokes of said pistons;
said drive means comprising a common armature connected to said pistons and a pair of electro-magnet means on opposite sides of said armature, and means for alternately energizing said electro-magnet means.

20. A fuel injection system as defined in claim 19 wherein there are four injection nozzles, four fuel chambers all connected to said means for supplying fuel under low pressure and individually connected to said nozzles, four pistons, said fuel chambers having their axes disposed in said common plane, said first and second stop means each being a unitary device whereby to limit the end stroke positions of all of said pistons.

21. In a fuel injection system as defined in claim 20 wherein said armature is of plate-like configuration having opposite side faces and is adapted to swing back and forth in directions perpendicular to said side faces, each electro-magnet comprising an E-frame presenting three legs and a winding on the central leg and said electro-magnets having the free ends of their legs disposed closely adjacent the respective side faces of said plate-like armature and between the opposite ends thereof, whereby as each electro-magnet is energized the armature swings progressively to a position closer to such electro-magnet.

22. In a fuel injection system as defined in claim 19 wherein said armature is of plate-like configuration having opposite side faces and is adapted to swing back and forth in directions perpendicular to said side faces, each electro-magnet comprising an E-frame presenting three legs and a winding on the central leg and said electro-magnets having the free ends of their legs disposed closely adjacent the respective side faces of said plate-like armature and between the opposite ends thereof, whereby as each electro-magnet is energized the armature swings progressively to a position closer to such electro-magnet.

23. In a fuel injection system as defined in claim 19 wherein said armature is of plate-like configuration having opposite side faces and is adapted to swing back and forth in directions perpendicular to said side faces, each electro-magnet comprising a frame presenting legs and a winding on said frame and said electro-magnets having the free ends of their legs disposed closely adjacent the respective side faces of said plate-like armature and between the opposite ends thereof, whereby as each electro-magnet is energized the armature swings progressively to a position closer to such electro-magnet.

24. In a fuel injection system, the combination of:
a cylinder block assembly having a plurality of fuel chambers therein, a plurality of pistons reciprocable in said chambers and cooperatively arranged in pairs in which as one piston of each pair moves in one direction within its chamber the other piston of each pair moves in the opposite direction within its chamber whereby said one piston causes fuel to enter its associated fuel chamber while the other piston causes fuel to be ejected under high pressure from its associated chamber and vice versa for the reversals of said directions of movement, drive means for indirectly urging said pairs of pistons back and forth in said direction; and
first stop means and second stop means for positively limiting the end points of the strokes of said pistons whereby to define the amounts of fuel delivered thereby, and control means for adjustably varying the position of at least one of said stop means correspondingly to vary said amounts of fuel delivered;
said drive means comprising a common armature connected to each pair of pistons and a pair of electro-magnet means on opposite sides of each armature, and means for alternately energizing said electro-magnet means.

25. In a fuel injection system as defined in claim 24 wherein there are four pistons arranged in two pairs thereof.

26. In a fuel injection system as defined in claim 25 wherein each armature is of plate-like configuration having opposite side faces and is adapted to swing back and forth in directions perpendicular to said side faces, each electro-magnet comprising an E-frame presenting three legs and a winding on the central leg and said electro-magnets having the free ends of their legs disposed closely adjacent the respective side faces of said plate-like armature and between the opposite ends thereof, whereby as each electro-magnet is energized the armature swings progressively to a position closer to such electro-magnet.

27. In a fuel injection system as defined in claim 24 wherein said armature is of plate-like configuration having opposite side faces and is adapted to swing back and forth in directions perpendicular to said side faces, each electro-magnet comprising an E-frame presenting three legs and a winding on the central leg and said electro-magnets having the free ends of their legs disposed closely adjacent the respective side faces of said plate-like armature and between the opposite ends thereof, whereby as each electro-magnet is energized the armature swings progressively to a position closer to such electro-magnet.

28. In a fuel injection system as defined in claim 24 wherein said armature is of plate-like configuration having opposite side faces and is adapted to swing back and forth in directions perpendicular to said side faces, each electro-magnet comprising a frame presenting legs and a winding on said frame and said electro-magnets having the free ends of their legs disposed closely adjacent the respective side faces of said plate-like armature and between the opposite ends thereof, whereby as each electro-magnet is energized the armature swings progressively to a position closer to such electro-magnet.

29. In combination with an internal combustion engine having at least one combustion chamber, a system for injecting fuel periodically to form combustible fuel-/air mixture charges for said combustion chamber, said system comprising:
a pump defining a pump chamber and having a movable member for increasing and decreasing the volume of said pump chamber;
inlet valve means for allowing fuel to enter said pump chamber as the volume thereof is increased;
outlet valve means for allowing fuel to be discharged from said pump chamber as the volume thereof is decreased;
an injector nozzle having a pressure-responsive outlet valve;
conduit means connecting said outlet valve means to said injector nozzle for delivering fuel under pressure thereto;
an armature connected at one end to said movable member and provided at its opposite end with pivot means for pivotally anchoring such opposite end thereof;
a pair of electro-magnets spaced on opposite sides of said armature between the opposite ends thereof to allow the armature freely to swing back and forth in the region between said electro-magnets;
first means for intermittently energizing one of said electro-magnets to decrease the volume of said pump chamber in timed relation to operation of said engine;
second means for intermittently energizing the other of said electro-magnets to increase the volume of said pump chamber, said first and second means being alternately operable;
a pair of spaced apart stop members operable to terminate motion of said armature as each electro-magnet is acting thereon, thereby to delineate the variation in volume of said pump chamber; and means for moving one stop member whereby to control the variations in volume of said pump chamber, said engine having at least two combustion chambers with one pump associated with each of such two combustion chambers, the second pump having inlet valve means and outlet valve means and a movable member, and there being a pressure-responsive injector nozzle associated with the second pump and conduit means connecting the second pump to its associated injector nozzle, and wherein both movable members are connected to said armature whereby as the volume of one pump chamber increases the volume of the other pump chamber decreases and vice versa, said first means being operated in timed relation with one combustion chamber and the second means being operated in timed relation with the other combustion chamber.

30. In the combination as defined in claim 29 wherein each movable member is in the form of a piston.

31. In a fuel injection system as defined in claim 29 wherein said armature is of plate-like configuration having opposite side faces and is adapted to swing back and forth in directions perpendicular to said side faces, each electro-magnet comprising an E-frame presenting three legs and a winding on the central leg and said electro-magnets having the free ends of their legs disposed closely adjacent the respective side faces of said plate-like armature and between the opposite ends thereof, whereby as each electro-magnet is energized the armature swings progressively to a position closer to such electro-magnet.

32. In combination with an internal combustion engine having at least one combustion chamber, a system for injecting fuel periodically to form combustible fuel/air mixture charges for said combustion chamber, said system comprising:

a pump defining a pump chamber and having a movable member for increasing and decreasing the volume of said pump chamber;

inlet valve means for allowing fuel to enter said pump chamber as the volume thereof is increased;

outlet valve means for allowing fuel to be discharged from said pump chamber as the volume thereof is decreased;

an injector nozzle having a pressure-responsive outlet valve;

conduit means connecting said outlet valve means to said injector nozzle for delivering fuel under pressure thereto;

an armature connected at one end to said movable member and provided at its opposite end with pivot means for pivotally anchoring such opposite end thereof;

a pair of electro-magnets spaced on opposite sides of said armature between the opposite ends thereof to allow the armature freely to swing back and forth in the region between said electro-magnets;

first means for intermittently energizing one of said electro-magnets to decrease the volume of said pump chamber in timed relation to operation of said engine;

second means for intermittently energizing the other of said electro-magnets to increase the volume of said pump chamber, said first and second means being alternately operable;

a pair of spaced apart rigid stop members operable substantially instantaneously to terminate motion of said armature as each electro-magnet is acting thereon, thereby to delineate the variation in volume of said pump chamber; and means for moving one stop member whereby to control the variations in volume of said pump chamber.

33. In a fuel injection system as defined in claim 32 wherein said armature is of plate-like configuration having opposite side faces and is adapted to swing back and forth in directions perpendicular to said side faces, each electro-magnet comprising an E-frame presenting three legs and a winding on the central leg and said electro-magnets having the free ends of their legs disposed closely adjacent the respective side faces of said plate-like armature and between the opposite ends thereof, whereby as each electro-magnet is energized the armature swings progressively to a position closer to such electro-magnet.

34. In a fuel injection system as defined in claim 32 wherein said armature is of plate-like configuration having opposite side faces and is adapted to swing back and forth in directions perpendicular to said side faces, each electro-magnet comprising a frame presenting legs and a winding on said frame and said electro-magnets having the free ends of their legs disposed closely adjacent the respective side faces of said plate-like armature and between the opposite ends thereof, whereby as each electro-magnet is energized the armature swings progressively to a position closer to such electro-magnet.

35. In a system for providing combustible fuel/air mixture to an internal combustion engine, in combination:

discharge means for discharging liquid fuel;

pump means connected to said discharge means and including a freely movable member for intermittently pumping liquid fuel to said discharge means;

electro-magnetic drive means for intermittently actuating said pump means to effect back and forth movements of said member, said electro-magnetic drive means including a pair of pulse generating circuits providing intermittent actuating pulses in timed relation to the associated internal combustion engine to energize said electro-magnetic drive means to effect said back and forth movements, an armature having opposite side faces and provided with pivot means at one end thereof for allowing said armature to swing back and forth in directions perpendicular to said side faces, said armature being connected at its other end to said movable member, an electro-magnet comprising a frame and a winding on said frame connected to one of said pulse generating circuits, said frame having at least two free end faces which are spaced apart from each other but which are disposed in closely spaced relation to regions of one side face of said armature which lie between the opposite ends thereof, whereby when said winding is energized to attract said armature and cause said movable member to discharge fuel said one side face of the armature swings progressively closer to said free end faces of electro-magnet with the result that fuel is discharged at a strongly increasing rate; and stop means for intercepting said movable member and substantially instantaneously terminating the motion thereof while said electro-magnetic drive means is actuating said pump means whereby positively to delineate the stroke of said movable member.

36. In a system as defined in claim 35 wherein each said pulse generating circuit comprises a monostable multivibrator including a time constant circuit which assures termination of electro-magnetic actuation substantially as soon as said armature engages said stop means.

37. In a system as defined in claim 35 wherein said pump means is double acting, said drive means includes a pair of movable members connected to said armature and a pair of electro-magnets disposed on opposite sides of said armature to effect double acting pump strokes, and wherein one pulse generating circuit is connected to one electro-magnet while the other pulse generating circuit is connected to the other electro-magnet.

38. In a system as defined in claim 37 wherein each pulse generating circuit includes a monostable multivibrator having a time constant circuit which assures termination of electro-magnetic actuation substantially as soon as said armature engages said stop means.

39. In a system for providing combustible fuel/air mixture to an internal combustion engine, in combination:

discharge means for discharging liquid fuel;

pump means connected with said discharge means for delivering liquid fuel to said discharge means;

drive means connected to said pump means for causing said pump means intermittently to deliver liquid fuel, said drive means comprising a freely movable actuator connected to said pump means, a pair of mutually opposed electro-magnets spaced on opposite sides of said actuator, and means for energizing said electro-magnets in time-separated sequential fashion step-wise to shuttle said actuator back and forth within the region between said electro-magnets; and control means for adjustably delineating the stroke of the step-wise shuttling movement of said actuator within the region between said electro-magnets whereby to control the quantity of liquid fuel intermittently delivered by said pump means, said control means comprising a pair of rigid stops spaced on opposite sides of said actuator, each stop acting to terminate the motion of said actuator substantially at the instant of interception by the stop, and at least one of said stops being movable to change its position of interception and wherein said actuator is pivoted to swing freely back and forth between said electro-magnets.

* * * * *